UNITED STATES PATENT OFFICE.

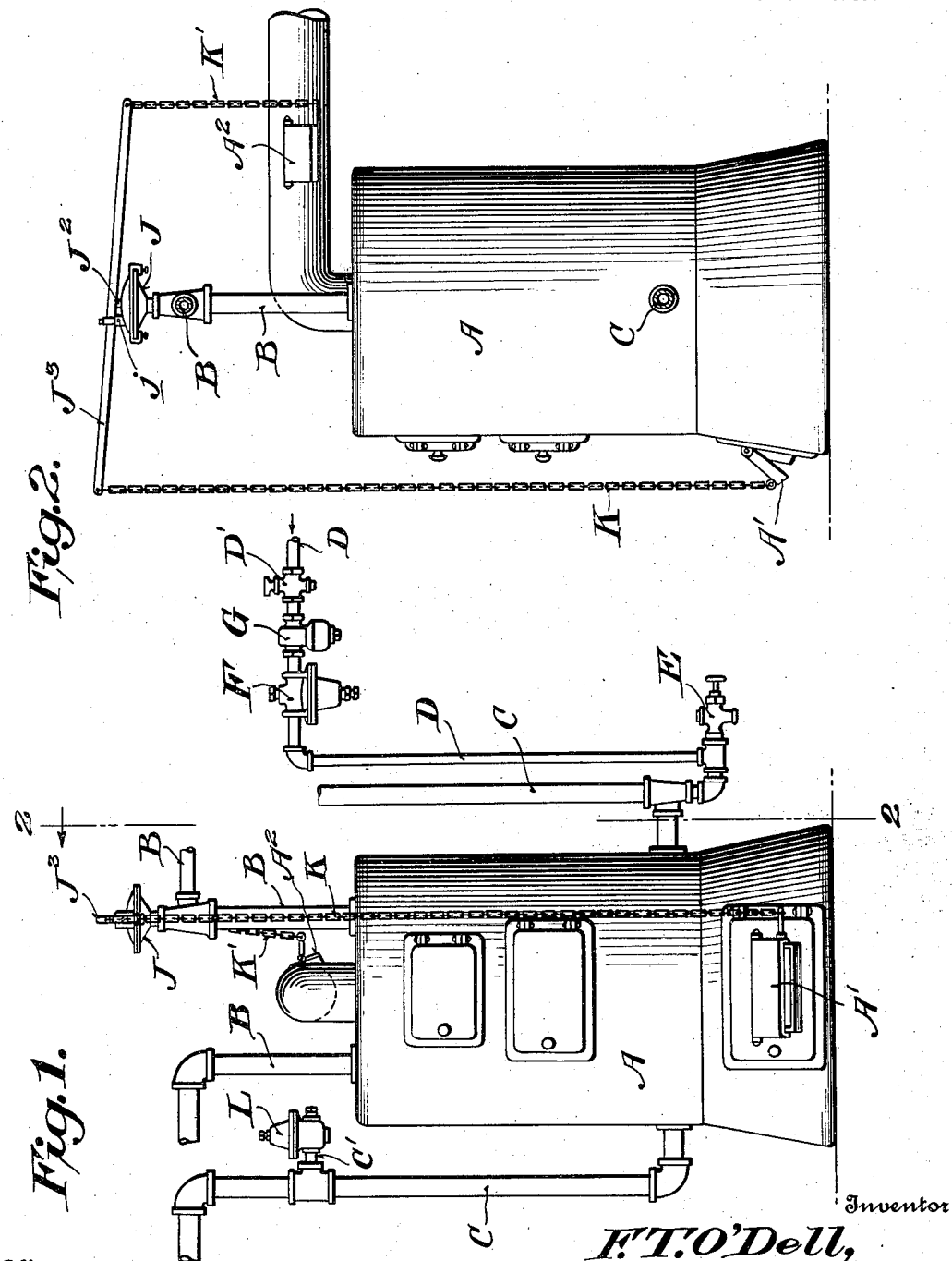

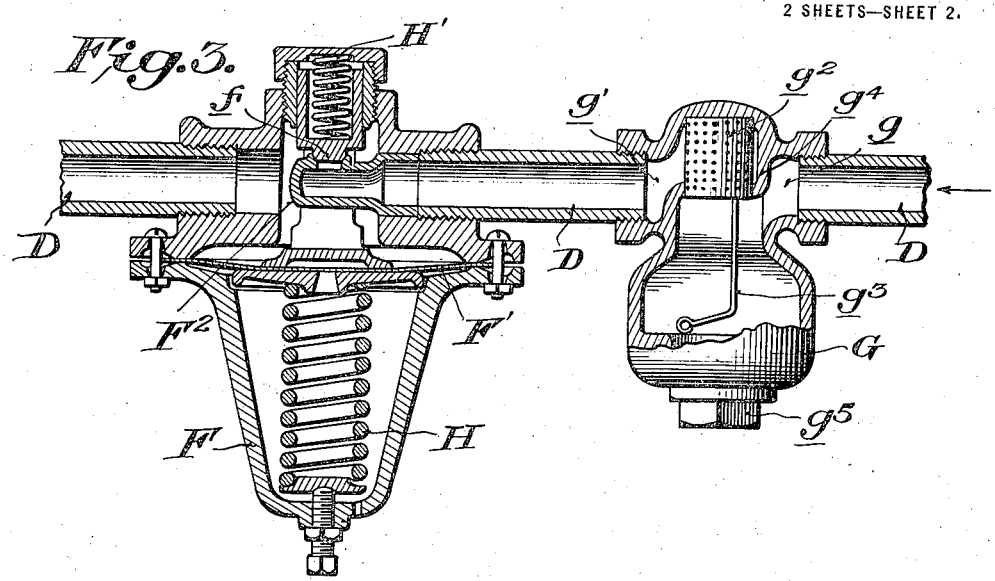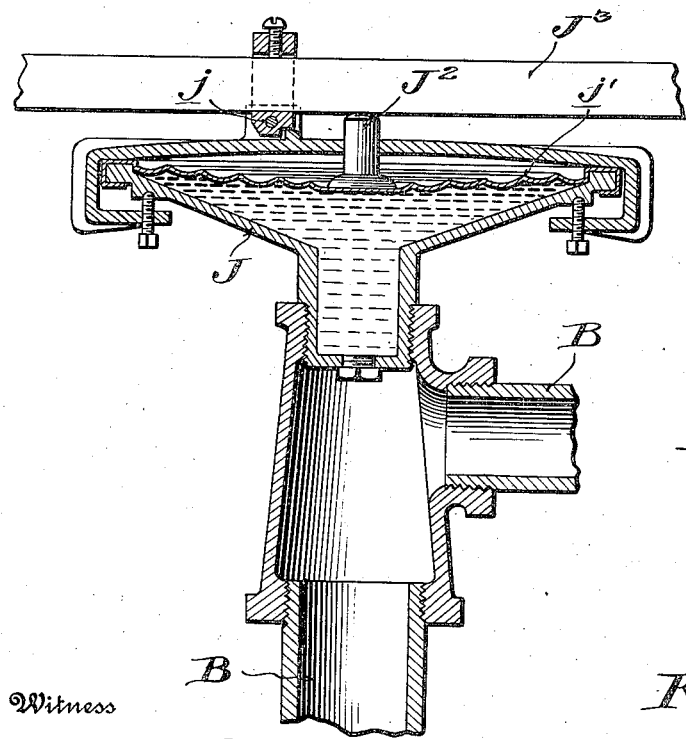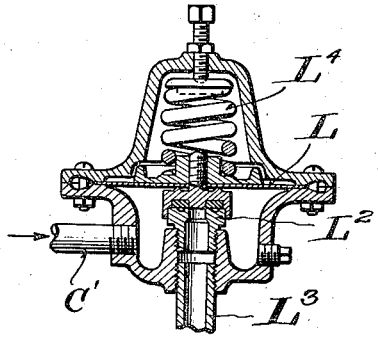

FRANK T. O'DELL, OF MINNEAPOLIS, MINNESOTA, ASSIGNOR TO H. MUELLER MANUFACTURING CO., OF DECATUR, ILLINOIS, A CORPORATION OF ILLINOIS.

HOT-WATER HEATING SYSTEM.

1,353,844.      Specification of Letters Patent.      Patented Sept. 28, 1920.

Application filed January 25, 1919. Serial No. 273,139.

*To all whom it may concern:*

Be it known that I, FRANK T. O'DELL, a citizen of the United States, residing at Minneapolis, in the county of Hennepin and State of Minnesota, have invented new and useful Improvements in Hot-Water Heating Systems, of which the following is a specification.

The present invention relates to an improvement in hot water heating systems. In particular the invention is an improvement upon systems of the type or class known as "closed" and has for its object to provide means by which the water in such a system will be automatically replenished whenever the pressure thereof falls below a predetermined amount.

The system constructed in accordance with the present invention avoids entirely the use of an expansion tank and also prevents the draft regulator apparatus of the heater being affected by changes in the amount of water in the system.

The system embodying the present invention is absolutely automatic in every particular requiring no attention after the parts have been properly adjusted.

In the accompanying drawings:

Figure 1 is a front elevation of a heater and parts of a system embodying the present improvements.

Fig. 2 is a side view, taken on the line 2—2 of Fig. 1.

Fig. 3 is an enlarged sectional view through the means provided for automatically supplying water to the system.

Fig. 4 is a sectional view on an enlarged scale of the damper control device of the heater.

Fig. 5 is a detail sectional view of a relief valve which is employed in the system.

Referring to the drawings, A designates a water heater which may be of any suitable style and with which are connected the hot water circulating pipes B and the cool water "return" pipes C. A pipe D is provided for connecting one of the return pipes C with a source of supply, for example a city main, through which water under pressure will be supplied to the system. An outlet valve E is provided through which the heater may be drained when desired, the supply pipe D being provided with a suitable cutoff D'.

In order that the water in the system may be maintained at a uniform pressure a suitable automatically acting reducing valve F is arranged in the supply pipe D and between this valve and the cutoff D' it is preferable to arrange a strainer G.

While strainers and pressure reducing valves of various types may be employed there is illustrated in Fig. 3 an arrangement which has been found to be very efficient for this purpose. Referring to said figure, it will be seen that the casing of the strainer G is provided with suitable inlet and outlet ports $g$—$g'$ between which is arranged a cylindrical sieve or screen $g^2$ that is supported by an arm $g^3$ resting on an interior flange near the bottom of the strainer G. A baffle $g^4$ extends partially over the inlet $g$ so that any particles of matter carried into the strainer G from the pipe D will be precipitated to the bottom of the strainer from which they may be withdrawn by removing a suitable waste plug $g^5$.

The reducing valve F comprises a suitable casing within which is arranged a diaphragm F' on which is supported a plug-like valve $f$ adapted to close the outlet of a pipe section $F^2$ that is interposed between sections of the main supply pipe D. Springs H—H' coöperate with the valve.

The tension of spring H is so adjusted that when the pressure of the water in the heater A has reached a predetermined point, the pressure, acting against the diaphragm F', will force the spring H back and permit the spring H' to close the valve $f$. On the other hand, when the pressure of the water in the heater A falls below the predetermined point, the tension of the spring H overcomes the combined force of the, now reduced, pressure of the water and the weaker spring H' thereby lifting the valve $f$ off of its seat, thus permitting the entrance of a sufficient quantity of water into the heater A to restore the desired pressure.

Means are provided whereby the draft controlling devices of the heater A are automatically controlled by variations in the temperature of the water circulating through the pipes B. One form of regulator which has been found satisfactory in practice is illustrated in Fig. 4. This comprises a casing J having a body of liquid therein which is readily expansible by heat over which is arranged a suitable diaphragm J'. The casing J is extended into one of the circulating pipes B of the system so that it will be heated by the water therein and on the diaphragm J' rests a pin J² that extends through a suitable slot or opening in the cover of the casing J into position to actuate a lever J³ that is fulcrumed at j on the top of the casing.

Chains K—K' connect the lever J³ with the lower draft door A' of the heater and with a check valve A² in the pipe connecting the heater with the chimney or stack. Therefore it is evident that when the temperature of the water in the system reaches a predetermined degree the lever J³ will be rocked to cut off the draft to the heater and when the water in the system has sufficiently cooled, the lever J³ will automatically return to the position shown in Fig. 2 and restore the draft through the heater A.

On one of the return pipes C of the system there is arranged a suitable relief valve L, the construction of which may be varied but which preferably is of the type or character illustrated in Fig. 5 in which a branch C' from the return pipe C enters a suitable casing below a diaphragm L with which is connected a valve that coöperates with a seat L² and controls the outlet L³. Above the diaphragm L' is arranged a suitable spring L⁴ the tension of which may be so controlled that the diaphragm and valve connected therewith will be raised when the pressure in the system exceeds a predetermined amount.

The operation of the improved system hereinbefore briefly described will be readily understood and the advantages thereof appreciated.

It will be seen that when the parts have been once properly adjusted no further attention by the owner or attendant is necessary to maintain the system full of water at the desired pressure. If the pressure in the system from any cause increases beyond that desired, the relief valve L will be opened and a portion of the water allowed to escape. Such escape of water however does not in any manner affect the operation of the damper regulating device which has been an objection to systems of the same general class heretofore proposed. As soon as the pressure in the system falls below that for which the reducing valve F is adjusted, additional water from the source of supply will be automatically introduced through the pipe D so that the pressure of water in the system will at all times be substantially uniform.

It will be seen that the invention comprises a minimum number of parts of simple construction which may be readily applied to any type of heater and provides a closed hot water heating system which is absolutely automatic in its action.

Having thus described the invention, what is claimed is:

1. In a closed hot water heating system, the combination of a heater; water circulating pipes connected with the heater; a supply conduit adapted to receive water at the pressure prevailing in a city main and connected with the water circulating pipes; a relief valve connected with the water circulating pipes; a pressure controlled damper regulator connected with the water circulating pipes, and means within the supply conduit for insuring that the circulating pipes shall be completely filled with water under a definite, predetermined pressure, less than that of the city main, and any wastage through the relief valve automatically replenished to maintain such pressure.

2. In a closed hot water heating system, the combination of a heater; water circulating pipes connected with the heater; a supply conduit connected with the circulating pipes and adapted to receive water under a relatively high pressure; a relief valve connected with the circulating pipes; a pressure controlled damper regulator connected with the water circulating pipes, and a reducing valve arranged in said supply conduit and adapted to insure the circulating pipes being filled with water at a predetermined, definite, pressure and to admit water to the circulating pipes to replace any discharged through the relief valve and maintain said predetermined pressure in the system.

In testimony whereof I have hereunto set my hand.

FRANK T. O'DELL.